Dec. 6, 1932.  H. TSCHERNING  1,890,203
MOLDING MACHINE
Filed July 20, 1931   3 Sheets-Sheet 1

Henry Tscherning Deceased
By Hugo K. Tscherning
Executor
By Durenforth, Lee, Chritton & Wiles,
Attorneys.

Dec. 6, 1932.                H. TSCHERNING                1,890,203
                              MOLDING MACHINE
                           Filed July 20, 1931         3 Sheets-Sheet 2
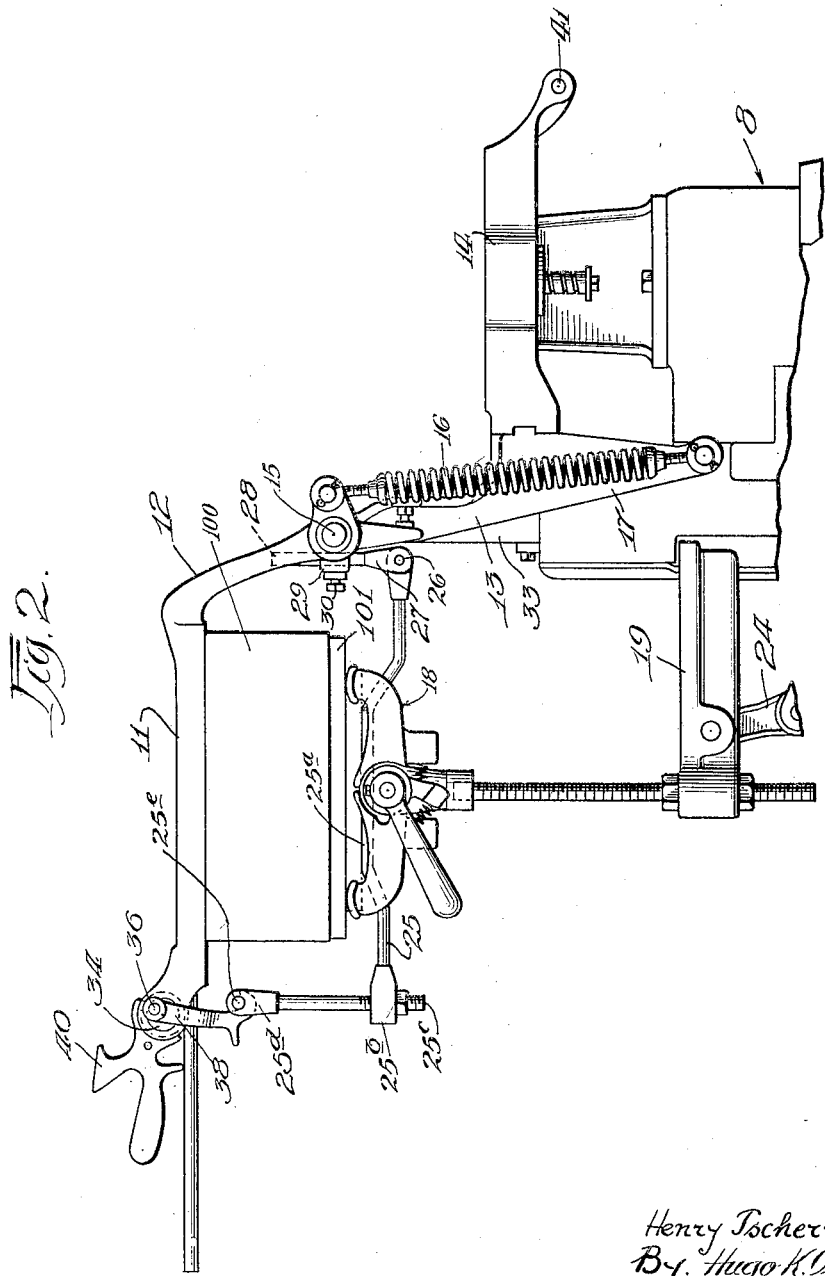
Henry Tscherning Deceased
By Hugo K. Tscherning,
        Executor,
By Dyrenforth, Lee, Chritton & Wiles,
                        Attorneys, Dec. 6, 1932. H. TSCHERNING 1,890,203
MOLDING MACHINE
Filed July 20, 1931 3 Sheets-Sheet 3
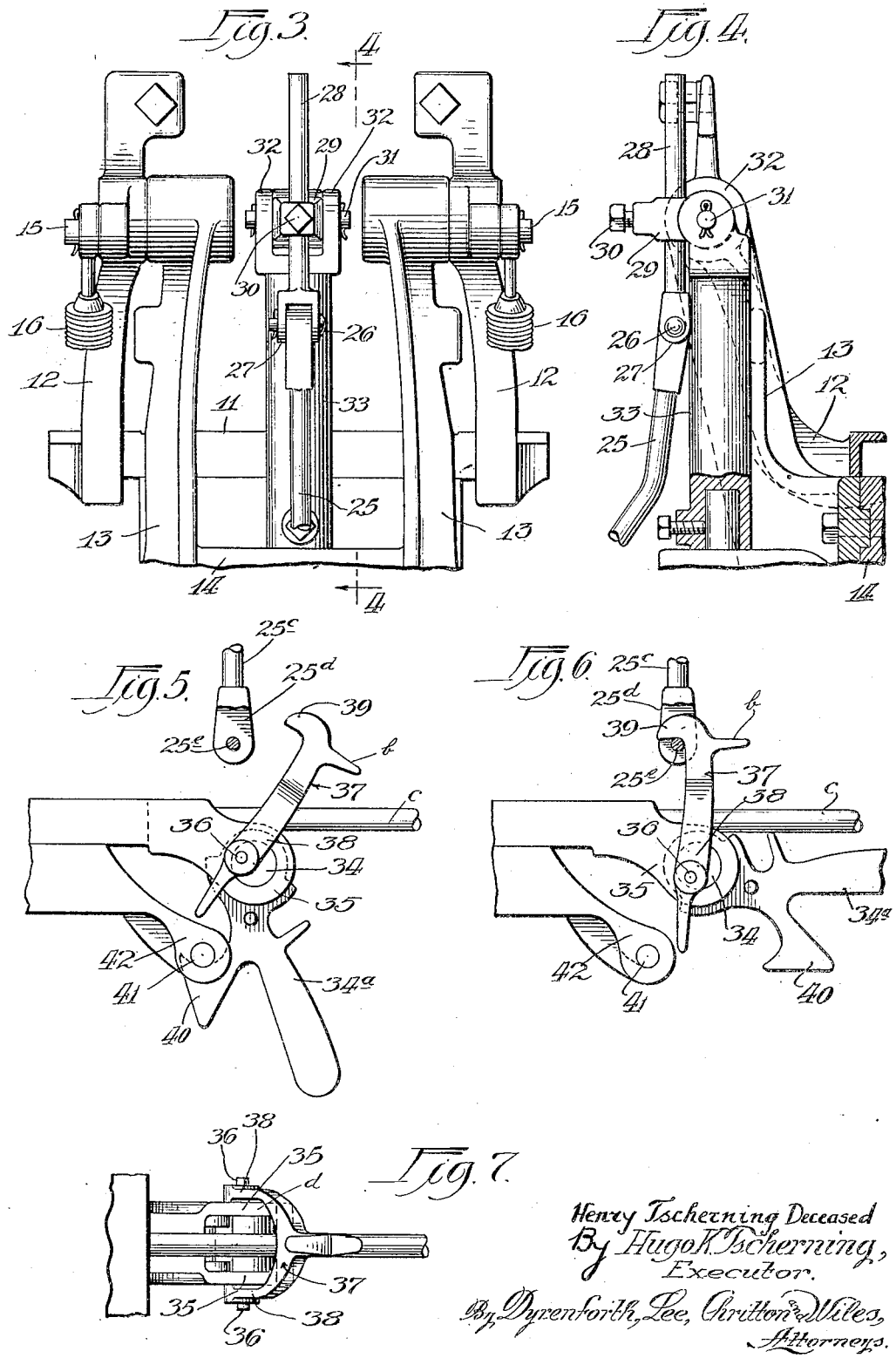

Patented Dec. 6, 1932

1,890,203

UNITED STATES PATENT OFFICE

HENRY TSCHERNING, DECEASED, LATE OF FREEPORT, ILLINOIS, BY HUGO K. TSCHERNING, EXECUTOR, OF FREEPORT, ILLINOIS, ASSIGNOR TO ARCADE MANUFACTURING COMPANY, OF FREEPORT, ILLINOIS, A CORPORATION OF ILLINOIS

MOLDING MACHINE

Application filed July 20, 1931. Serial No. 552,031.

The invention relates to molding machines comprising a rotatably mounted carrier for the flask which, in the operation of the machine, is bodily raised and lowered with the journals on which it is mounted as for example and more particularly in the operation of jarring the mold to compact the sand therein.

Such machines employ clamps movable into and out of a position for clamping the flask to the carrier. These clamps which are pivotally supported for the movement referred to are commonly supported on a part of the machine which moves vertically in the bodily movement of the carrier as above referred to and especially where the journalling support for the carrier moves up and down in the jarring operation in which the clamp is swung to non-operative position, presents the disadvantage of likewise moving the clamp up and down which is objectionable.

One of the objects of the invention is to provide for the supporting of the clamp in such a manner that while it may rotate with the carrier in inverting the mold and not change its position relative to the mold and carrier, it will remain motionless when out of clamping position during the vertical bodily movement of the carrier, as for example during the jarring of the latter.

Another object is to provide a single operating element which will serve the double purpose of locking the carrier to the jarring mechanism and also locking the clamp in flask-clamping position; and other objects as will be manifest from the following description.

Referring to the accompanying drawings:

Figure 2 is a view like Fig. 1 of the upper portion of the machine showing it in a position in which the flask-carrier is inverted to "pattern-drawing" position.

Figure 3 is a view in end elevation of the carrier and the structure on which it is revolubly mounted together with a portion of the flask-clamp and the mounting thereof, the machine being viewed from the left-hand side of Fig. 1.

Figure 4 is a sectional view taken at the line 4—4 on Fig. 3 and viewed in the direction of the arrows.

Figure 5 is a broken view of the carrier, its support and the flask clamp showing the mechanism for clamping the carrier to the support and the clamp to the flask, the parts being shown in carrier-clamping position, with the flask-clamp disengaged.

Figure 6 is a similar view of the same parts, which are herein shown in flask-clamping position with the means for clamping the carrier to the support in disengaged position; and Figure 7, a plan view of the clamping mechanism of Figs. 5 and 6 but with the flask-clamp omitted.

Figure 1:
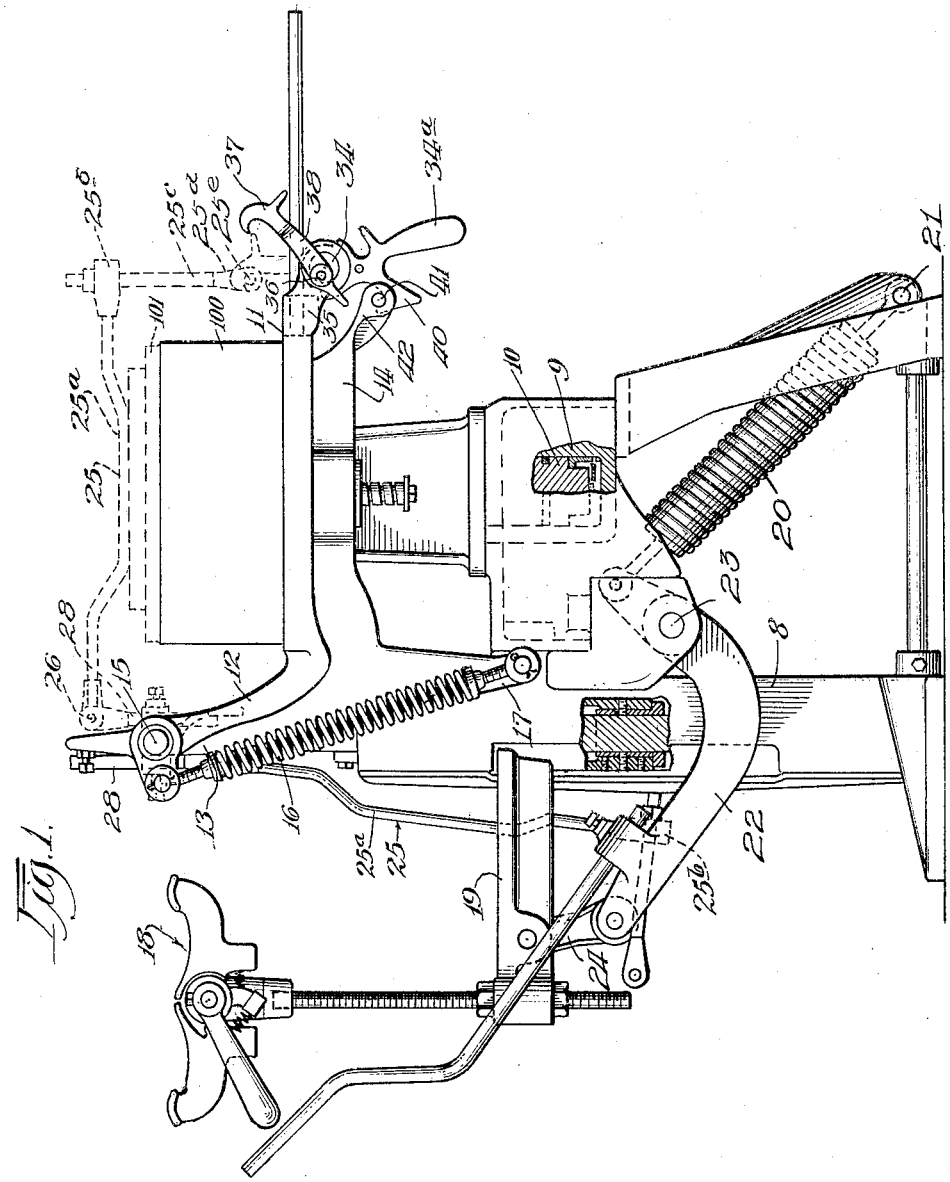
Figure 1 is a view in side elevation, with certain parts broken away and shown in section, of a molding machine of the marginally hinged carrier type equipped with flask-clamp means and carrier hold-down means in accordance with the invention, this view showing by full lines the position occupied by the carrier when in jarring position.

The machine in connection with which it has been chosen to illustrate the invention is of the so-called marginally hinged carrier type wherein the carrier in one position supports the flask in position for forming the mold and when rotated about its journal support to inverted position positions the flask for separation of the pattern and mold.

The machine shown and which is of a general construction well known in the art comprises, generally stated, a main body portion 8 provided at one end with jarring mechanism comprising a cylinder portion 9 to which the fluid-pressure for actuating this mechanism is supplied, and a piston 10 movable up and down in the cylinder 9. In accordance with common practice fluid pressure to raise the piston is admitted into the bottom of the cylinder 9 and following the lifting of the piston is permitted to vent, thus permitting the piston to fall and effect, by its abrupt stopping, the desired jarring action, these alternate operations of admitting fluid to the cylinder 9 and venting the latter continuing until the desired amount of jarring has been effected.

The carrier for the pattern and for the flask shown at 100 and in which the mold is to be formed is represented at 11 and is marginally hinged at spaced apart upwardly-extending arms 12, to a pair of spaced-apart upwardly-extending arms 13 of a plate member 14, as represented at 15. The plate member 14 extends across the top of the piston 10 and is rigidly secured thereto and thus, together with the carrier 11, is moved up and down in the jarring movements of the piston 10.

Coil springs 16, as commonly provided in this type of machine, connect at their upper ends with the carrier 11 at points eccentric of the axis of the hinge connection of the carrier with the arms 13, and at their lower ends with depending arms 17 on the plate member 14 at opposite sides of the machine, these springs serving to substantially counterbalance the weight of the overhung parts of the carrier due to its marginal hinging.

The machine at the other end thereof is provided with a vertically movable flask-rest device represented generally at 18 and shown as of well known construction and provided to receive the flask in the swinging of the carrier 11 from the position shown in Fig. 1, in which the mold is produced, to the position shown in Fig. 2, and by lowering the device 18 separate the pattern from the mold. The device 18 is formed with a body portion 19 supporting the vertically adjustable flask-rests one at each side of the machine, the portion 19 being slidable vertically on the main body portion 8. The flask-rest mechanism is held normally in raised position as by the spring-tensioned mechanism shown and comprising a coil spring 20 secured at its lower end, as represented at 21, to a stationary part of the machine and at its upper end to an arm of a bell crank lever 22 fulcrumed at 23 on the body portion 8 of the machine and having link connection at 24 with the plate member 19 of the flask-rest mechanism.

The machine also comprises a clamp for clamping the flask 100 to the carrier 11, with a bottom board 101 for the flask interposed between the flask and the clamp, to hold these parts together in the turn-over movement of the carrier to the position shown in Fig. 2. The clamp in accordance with the particular illustrated embodiment of the invention comprises a bar 25 preferably formed, between its ends, with a deflected portion 25$^a$ the outer end of this bar terminating in a head 25$^b$ in which a rod 25$^c$, extending at a right angle to the bar 25, is threaded for longitudinal adjustment the terminal end of the rod 25$^c$ being in the form of a yoke 25$^d$ having a cross-pin 25$^e$.

The bar 25 is pivotally connected at 26 with the bifurcated end 27 of a rod 28 adjustable lengthwise in a head 29 and held in adjusted position by a set-screw 30 on this head, the head being pivotally mounted on a pin 31 supported in the spaced apart ears 32 on the upper end of a post 33 rising from, and rigidly secured to, the body portion 8, the pivoting pin 31 being located between the journals 15 and in axial alinement therewith.

It may be here stated that the clamp described is adapted to be swung into either flask-clamping position as shown by dotted lines in Fig. 1 and by full lines in Fig. 2 or into inactive position as shown by full lines in Fig. 1.

The clamp cooperates with means for drawing the clamp into tight clamping engagement with the bottom board 101 and maintaining the clamp in such position, these means comprising a shaft 34 rotatably mounted at its ends in spaced apart ears 35 extending laterally from the carrier 11 and having crank pins 36 at its ends on which a bifurcated latch lever 37 is pivoted at its arms 38, the lever 37 having a lug 39 adapted to extend over, and engage with, the cross-pin 25$^e$.

The shaft 34 is connected between its ends with an operating lever represented at 34$^a$ and provided with a hook-lug 40 adapted to be swung beneath, and in engagement with, a cross-pin 41 mounted in spaced apart ears 42 on the member 14.

In the jarring operation of the machine the carrier 11 occupies a position in which it flatwise rests on the member 14 with the flask 100 positioned on the carrier 11 and filled with sand covering the pattern on the carrier as shown in Fig. 1 the lever 34$^a$ having been operated to the position shown in Fig. 5 whereby the carrier 11 and member 14 are rigidly held together to rise and fall as a unitary structure in the jarring operation, during which the flask-clamp remains inactive in the depending position shown in Fig. 1.

After the jarring operation has been completed, the sand is struck-off level with the top of the flask, more sand being added to the flask, if necessary, and the bottom board 101 then applied to the position shown. The flask clamp is then swung at its pivot 31 into the dotted position shown in Fig. 1; the latch lever 37 swung to extend at its lug 39 over the cross pin 25$^e$; and the lever 34$^a$ swung in counterclockwise direction in Fig. 5 to disengage its lug 40 from the cross-pin 41 and rotate the shaft 34 the eccentric connections of the lever 37 with this shaft operating to draw the lever 37 downwardly against the pin 25^e to the position shown in Fig. 6 in which the clamp firmly presses against the bottom board 101.

The parts in clamped position as stated are then swung to the inverted position shown in Fig. 2 to deliver the flask to the flask-rest mechanism the carrier swinging at its pivot 15 and the flask-clamp swinging on the pivot 31. The latch lever 37 is then disengaged from the pin 25^e, permitting the clamp to swing at the pivot 26 to depending position shown in Fig. 1, and the flask lowered from the pattern on the carrier 11 by lowering the flask-rest mechanism.

While there has been illustrated and described a particular embodiment of the invention, it is not to be understood as tending to limit it thereto, as the same may be variously modified and altered without departing from the spirit of the invention.

What is claimed as new, and desired to be secured by Letters Patent, is:

1. A molding machine comprising a revoluble carrier for the flask mounted to be vertically movable bodily, and a clamp for clamping the flask to said carrier pivotally supported on a stationary part of the machine on an axis substantially in alinement with the axis about which said carrier swings.

2. A molding machine comprising a marginally hinged carrier for the flask mounted to be vertically movable bodily, and a clamp for clamping the flask to said carrier pivotally supported on a stationary part of the machine on an axis substantially in alinement with the axis about which said carrier swings.

3. A molding machine comprising jarring mechanism, a revoluble carrier for the flask supported on said jarring mechanism, a clamp element for clamping the flask to said carrier and rotatable with said carrier and a device operative to alternately engage said carrier for clamping said carrier to said jarring mechanism and engage said clamp element for causing said element to be in clamping position.

4. A molding machine comprising jarring mechanism, a revoluble carrier for the flask supported on said jarring mechanism, a clamp element for clamping the flask to said carrier and rotatable with said carrier and a movable device operative in its movement in one direction to engage said carrier and clamp said carrier to said jarring mechanism and in its movement in the opposite direction to disengage said carrier and engage said clamp element for causing said element to be in clamping position.

5. A molding machine comprising jarring mechanism, a revoluble carrier for the flask supported on said jarring mechanism, a clamp element for clamping the flask to said carrier and rotatable with said carrier, a rock member on said carrier, and a lever having eccentric engagement with said rock member for engaging said clamp, said rock member having a portion adapted to engage said jarring mechanism for clamping said carrier to said jarring mechanism.

6. A molding machine comprising jarring mechanism, a marginally hinged carrier for the flask supported on said jarring mechanism, a clamp element for clamping the flask to said carrier and rotatable with said carrier and a device operative to alternately engage said carrier for clamping said carrier to said jarring mechanism and engage said clamp element for causing said element to be in clamping position.

7. A molding machine comprising jarring mechanism, a support movable by said mechanism, a flask-carrier marginally hinged to said support, a clamp element for clamping the flask to said carrier and rotatable with said carrier, and a device operatively connected with said carrier and operative to alternately engage said carrier for clamping said carrier to said support and engage said clamp element for causing said element to be in clamping position.

8. A molding machine comprising jarring mechanism, a support movable by said mechanism, a flask-carrier marginally hinged to said support, a clamp element for clamping the flask to said carrier and rotatable with said carrier, and a rotatable device operative in its movement in one direction to engage said carrier and clamp said carrier to said support and in its movement in the opposite direction to disengage said carrier and engage said clamp element for causing said element to be in clamping position.

HUGO K. TSCHERNING.
*Executor of Henry Tscherning, Deceased.*